(12) United States Patent
Goodrum

(10) Patent No.: US 9,649,654 B2
(45) Date of Patent: May 16, 2017

(54) BOTTLE NECK SALTER

(71) Applicant: Janice Annette Goodrum, Clute, TX (US)

(72) Inventor: Janice Annette Goodrum, Clute, TX (US)

( * ) Notice: Subject to any disclaimer, the term of this patent is extended or adjusted under 35 U.S.C. 154(b) by 32 days.

(21) Appl. No.: 14/806,659

(22) Filed: Jul. 23, 2015

(65) Prior Publication Data

US 2016/0022071 A1 Jan. 28, 2016

Related U.S. Application Data

(60) Provisional application No. 62/028,288, filed on Jul. 23, 2014.

(51) Int. Cl.
| | |
|---|---|
| *B05C 1/00* | (2006.01) |
| *A47G 19/22* | (2006.01) |
| *A23P 20/12* | (2016.01) |
| *A47G 23/00* | (2006.01) |
| *B05C 19/00* | (2006.01) |

(52) U.S. Cl.
CPC ............. *B05C 1/00* (2013.01); *A47G 19/22* (2013.01); *A23P 20/12* (2016.08); *A47G 23/00* (2013.01); *B05C 19/008* (2013.01)

(58) Field of Classification Search
CPC ........ A47G 23/00; B05C 1/00; B05C 19/008; A23P 20/12; A23L 2/56; A23L 2/60; A23V 2002/00; B43M 11/04; A47L 17/08
USPC .... 118/13, 26, 308, 264, 270; 426/115, 120, 426/590; 15/104.93, 104.94, 104.92, 15/210.1, 211, 244.1
See application file for complete search history.

(56) References Cited

U.S. PATENT DOCUMENTS

| | | | | |
|---|---|---|---|---|
| 2,940,420 | A | * 6/1960 | Nelson | A45D 40/0075 118/265 |
| 3,004,515 | A | * 10/1961 | Hummel | B43M 11/04 118/270 |
| D421,061 | S | * 2/2000 | Yashar | D19/70 |

* cited by examiner

*Primary Examiner* — Laura Edwards

(57) ABSTRACT

A device is provided to salt a bottle neck. The device can be used in the hospitality industry. The old process to salt a bottle neck by hand to serve a customer was messy, slow, and resulted in a clumpy mess. This device allows the server to coat a bottle evenly with salt or any garnish quickly, evenly, and with little to no overspill of the salt. This device stores the salt securely for health and sanitation. It can also be used to garnish any food product with any coating with a professional and quality result. This device is simple, compact, easy to maintain, and a new solution to a service industry functional problem.

2 Claims, 11 Drawing Sheets

BOTTLE NECK SALTER

CROSS-REFERENCE TO RELATED APPLICATIONS

See ADA sheet attached.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention can be used in several fields of endeavor but is primarily an invention for coating a cylindrical object, such as a bottle neck of a beverage, with salt, sugar, or any other granular substance in the food and beverage industry.

Problem Solved: To salt the neck of any bottled beverage by hand or otherwise is messy, inefficient, and time consuming to a bartender, chef, or server. The salt gets all over the counter, hands, and everywhere else as you try to sprinkle it sporadically on the object. The time it takes to manually salt a bottle is lost sales. The finished product is inconsistent, unevenly coated, and not visually appealing. This invention can evenly coat a bottle in seconds with a simple roll in the salt.

BRIEF SUMMARY OF THE INVENTION

As stated above, to salt the neck of any bottled beverage is messy, inefficient, and time consuming to a bartender, chef, or server. The finished product is inconsistent and not visually appealing. The invention claimed here solves this problem.

This device is quick, clean, and streamlined to make the bottle salting process a quicker and more successful task. Self-contained and hygienic with a lid (FIG. 1/ref 1), this device holds the salt at a slant with a curved opening (FIG. 1/ref 2) for the bottle neck to rest on. The lid has a planar surface, an inset ridge (FIG. 7, ref 1) extending about the perimeter of the planar surface, the inset ridge including four adjacent lid sidewalls, two of the lid sidewalls being parallel with two traversing lid sidewalls being of a lesser length than the longer parallel lid sidewalls, one of the traversing lid sidewalls having a tongue attached thereto, the tongue extending therefrom a predetermined length beyond a height of the lid sidewalls, the tongue sized and shaped to matingly engage a U-shaped cutout of container body (FIG. 7/ ref 2) to form a flush fit and thereby completely seal the lid on the container body when the device is to be closed; wherein when the device is opened, the lid can be removed from the container body and inverted, a sloping sponge (FIG. 9/ ref 3), having an upper surface and planar bottom surface, can be placed within the inverted lid to dampen the bottle neck and the dampened bottle neck can be placed in the U-shaped cutout and rolled in edible substance within the container body for uniformly coating the bottle neck with the edible substance. The inverted lid can be placed within a slanted opening formed on an exterior of the bottom of the container body which is sized to fit on the lid to enable the inverted lid to store the container body thereon for saving storage space. The bottle neck can be coated evenly with the salt, sugar, or any other edible garnish, (FIG. 11/ref 2). The multipurpose lid can also be placed under the container body for not only storage but elevation of the device.

A lid with a swivel feature is also an option.

The claimed invention differs from what currently exists. A margarita or glass rimmer is made for round, oval, square, and other various shaped open glassware, not long bottle necks and salt goes everywhere when used for a bottle. This device is custom made for a bottle with elongated dimensions, has a slanted bottom (FIG. 2/ref 2), a secure hygienic fitted lid (FIG. 2/ref 1), and takes up a much smaller space on a work station or counter. It is self contained and this design allows for fast production. There is no other device to compare to the instantly claimed invention.

This device streamlines the bottle garnishing task making it quick, clean, consistent, and more efficient.

BRIEF DESCRIPTION OF THE SEVERAL VIEWS OF THE DRAWING

The Invention Illustrated in this Patent Application Includes.

RELATIONSHIP BETWEEN THE COMPONENTS

Figure 1:
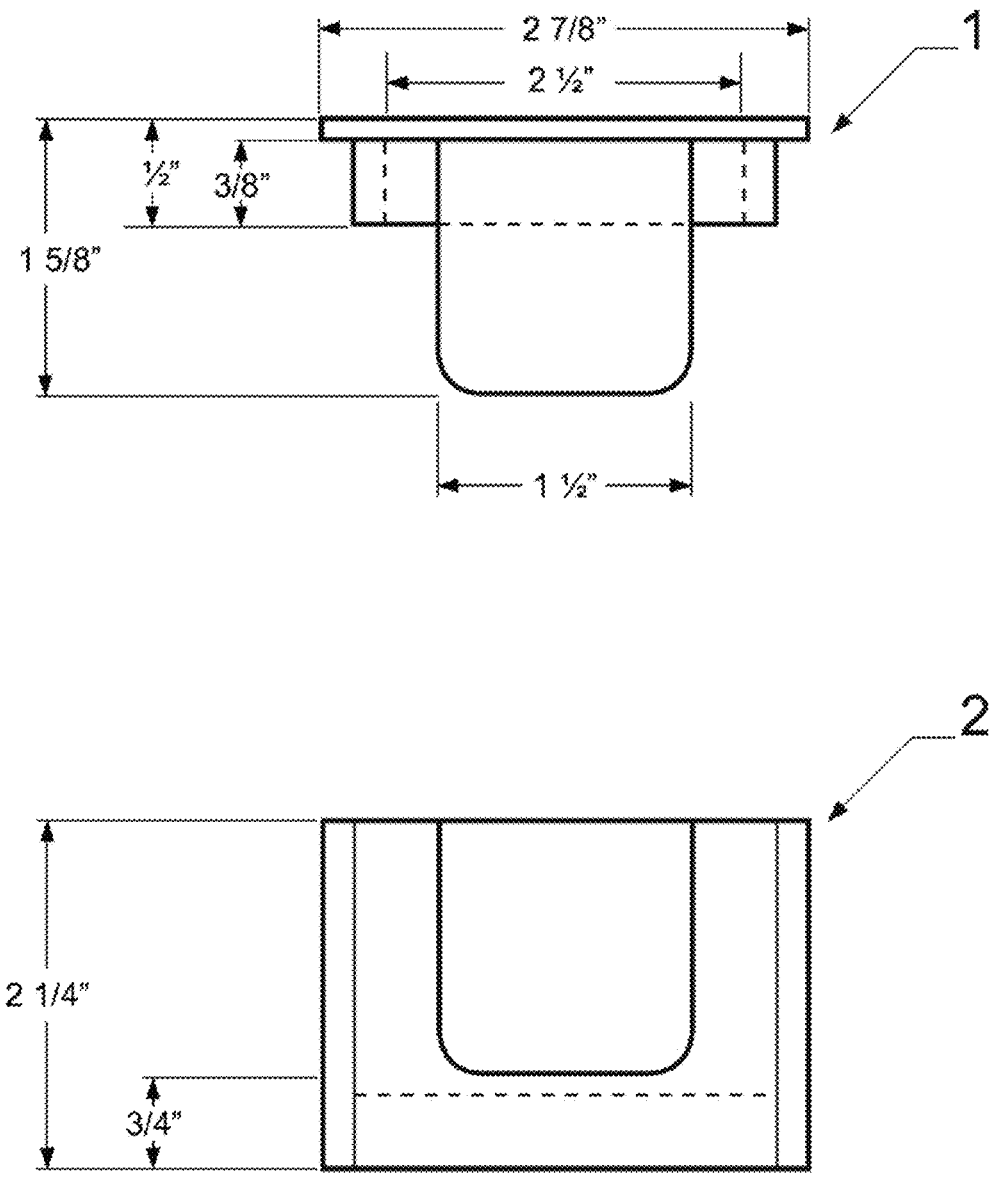
FIG. 1 Bottle Neck Salter Elevation View—Front: Lid & Body, Ref 1 & 2

Reference character 1 is the multi function lid or cover
Reference character 2 is the main compartment or body that holds the garnish material.
Reference character 3 is the sponge which fits in the multi function lid or cover.

DETAILED DESCRIPTION OF THE INVENTION

Figure 4:
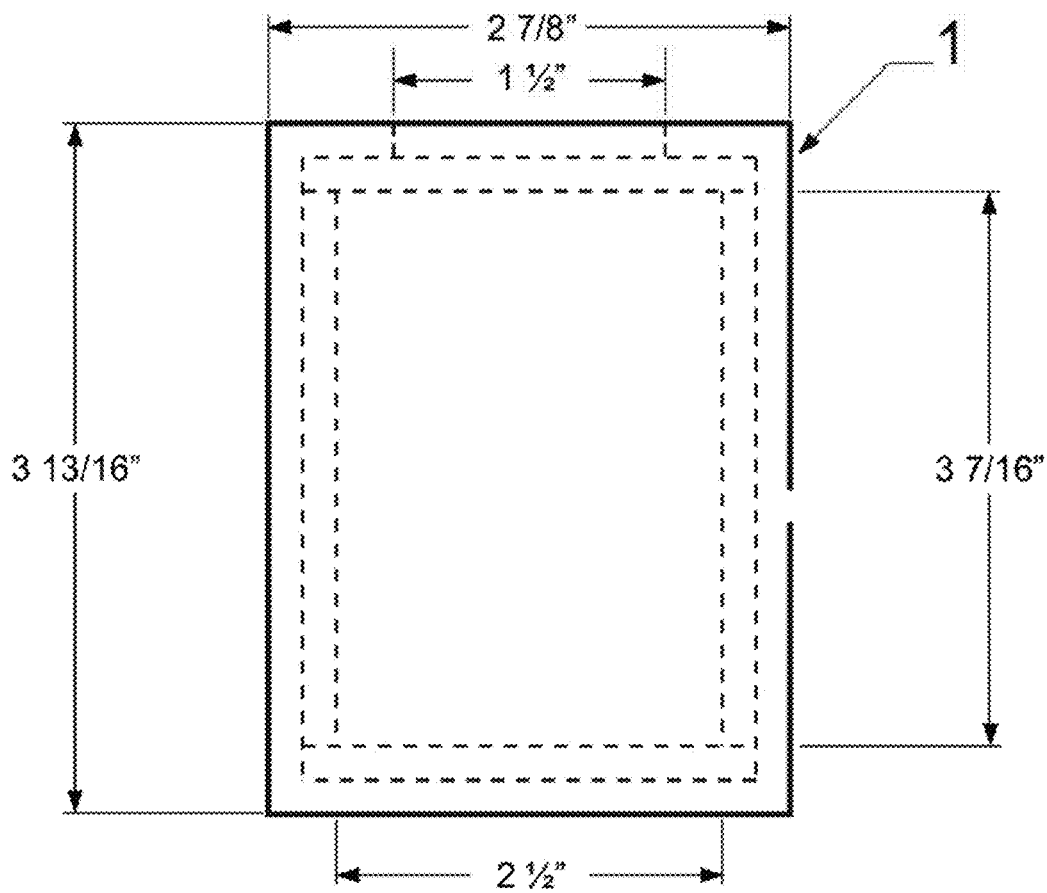
FIG. 4 Bottle Neck Salter Elevation View—Top Plan View: Lid, Ref 1
Figure 5:
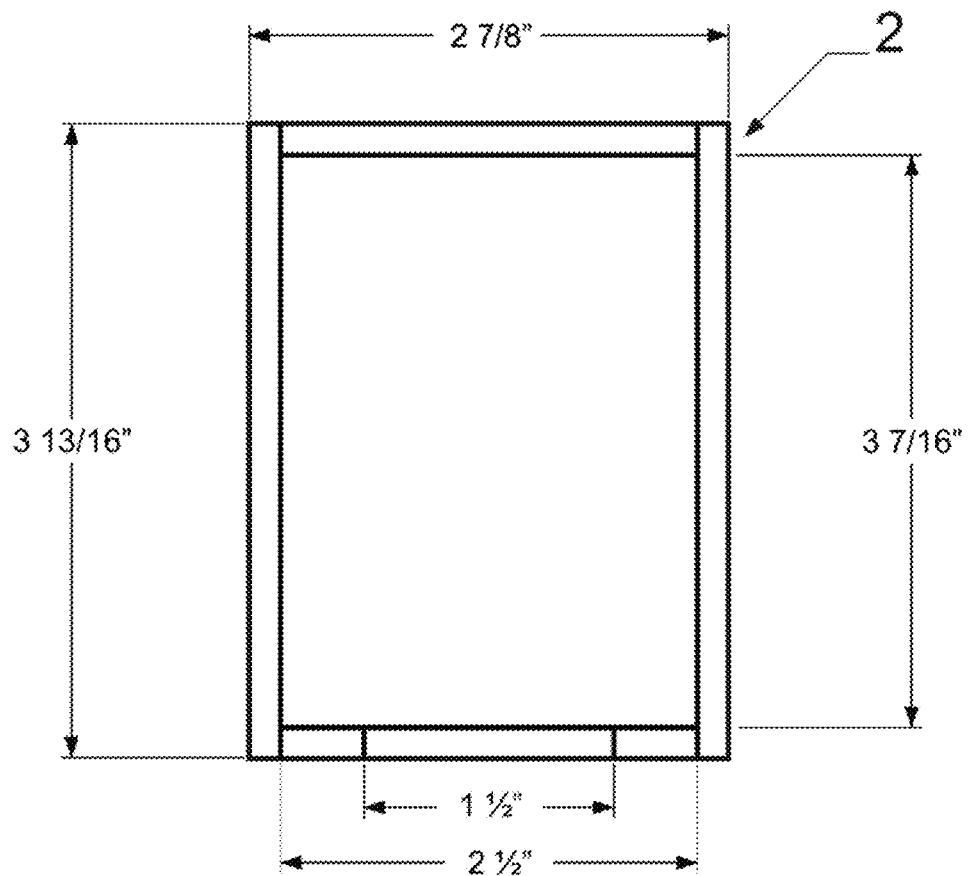
FIG. 5 Bottle Neck Salter Elevation View—Top Plan View: Body, Ref 2
Figure 6:
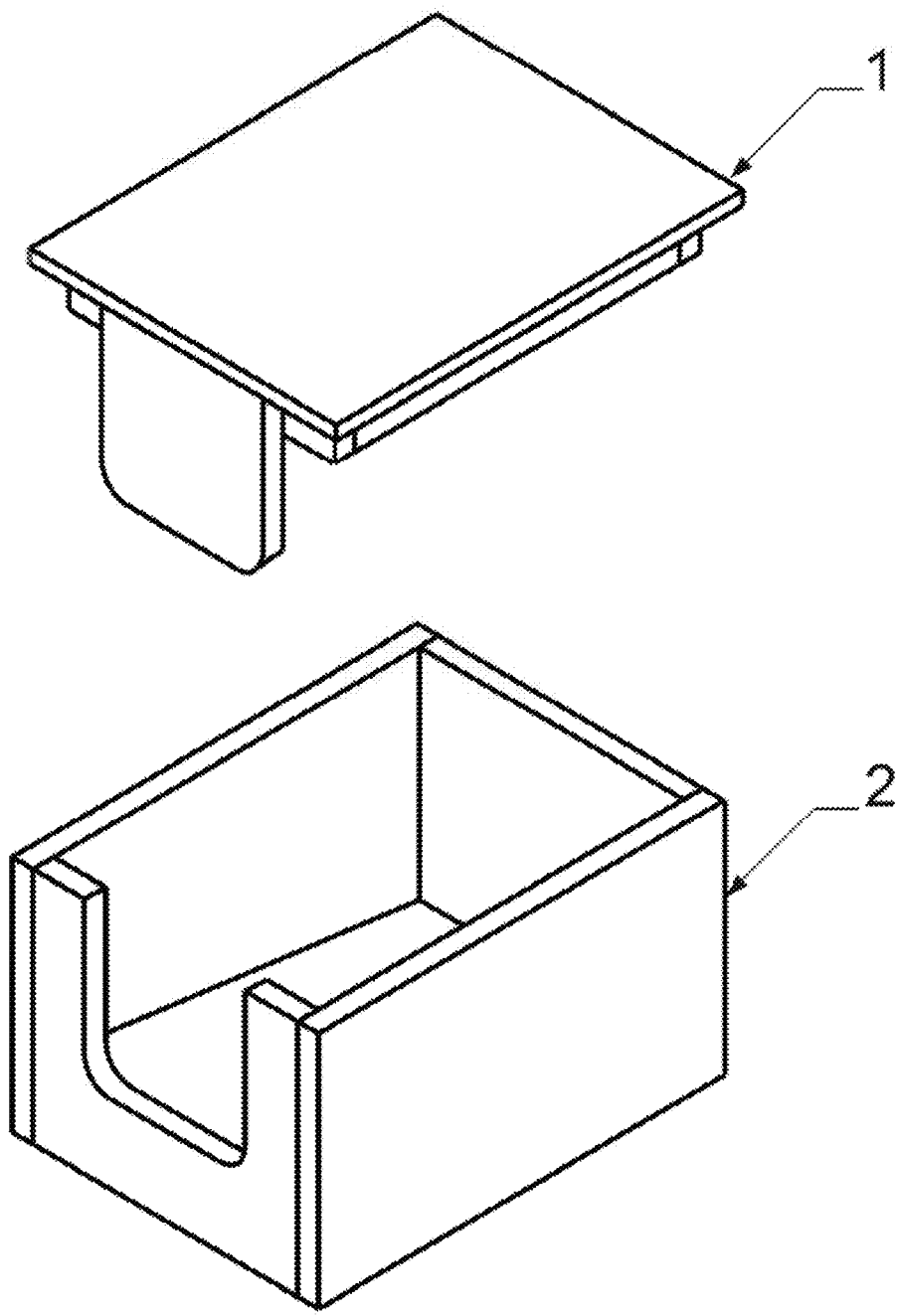
FIG. 6 Bottle Neck Salter Isometric View—Lid & Body, Ref 2
Figure 7:
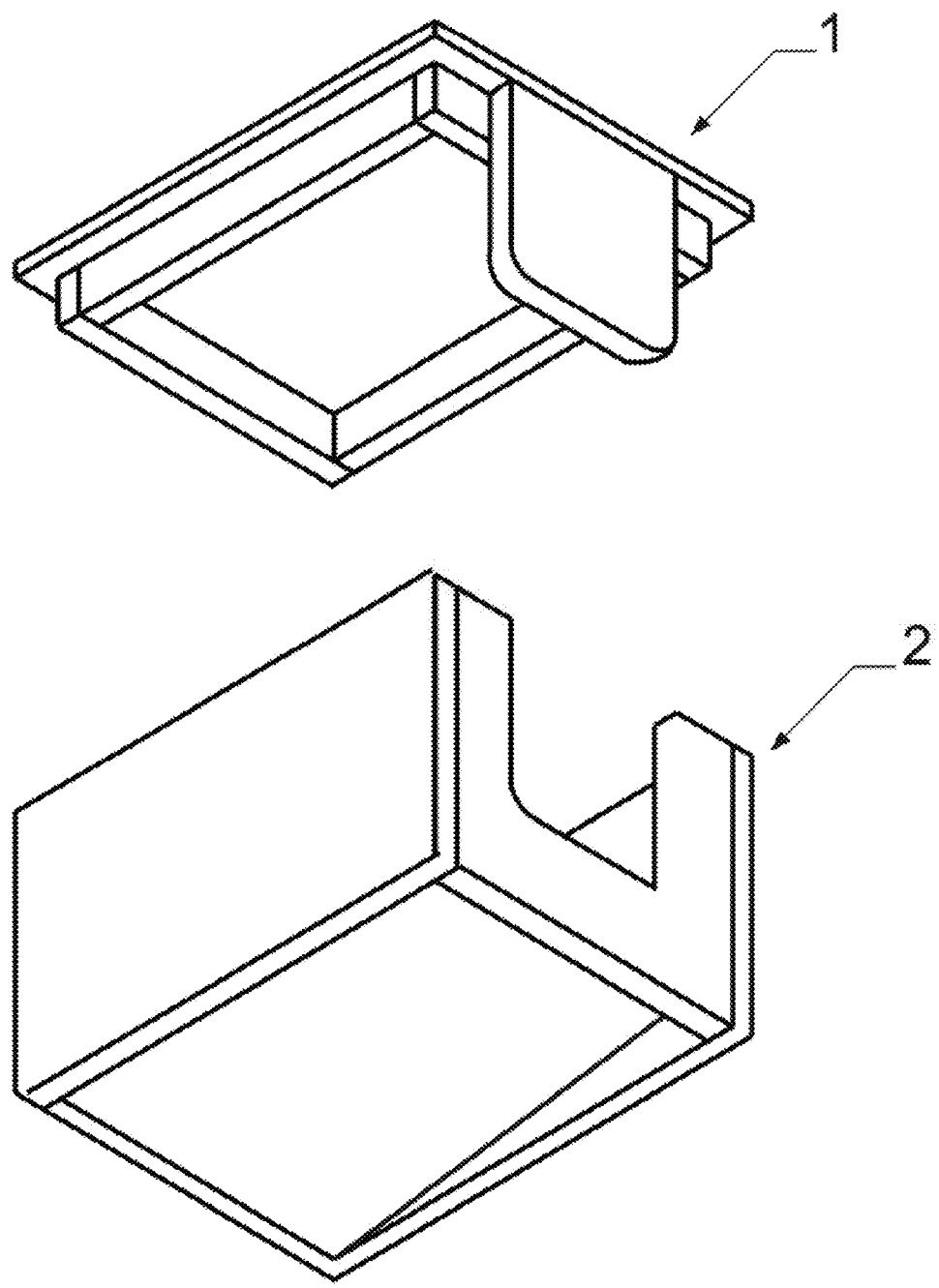
FIG. 7 Bottle Neck Salter Isometric View—Bottom: Lid & Body, Ref 1 & 2
Figure 8:
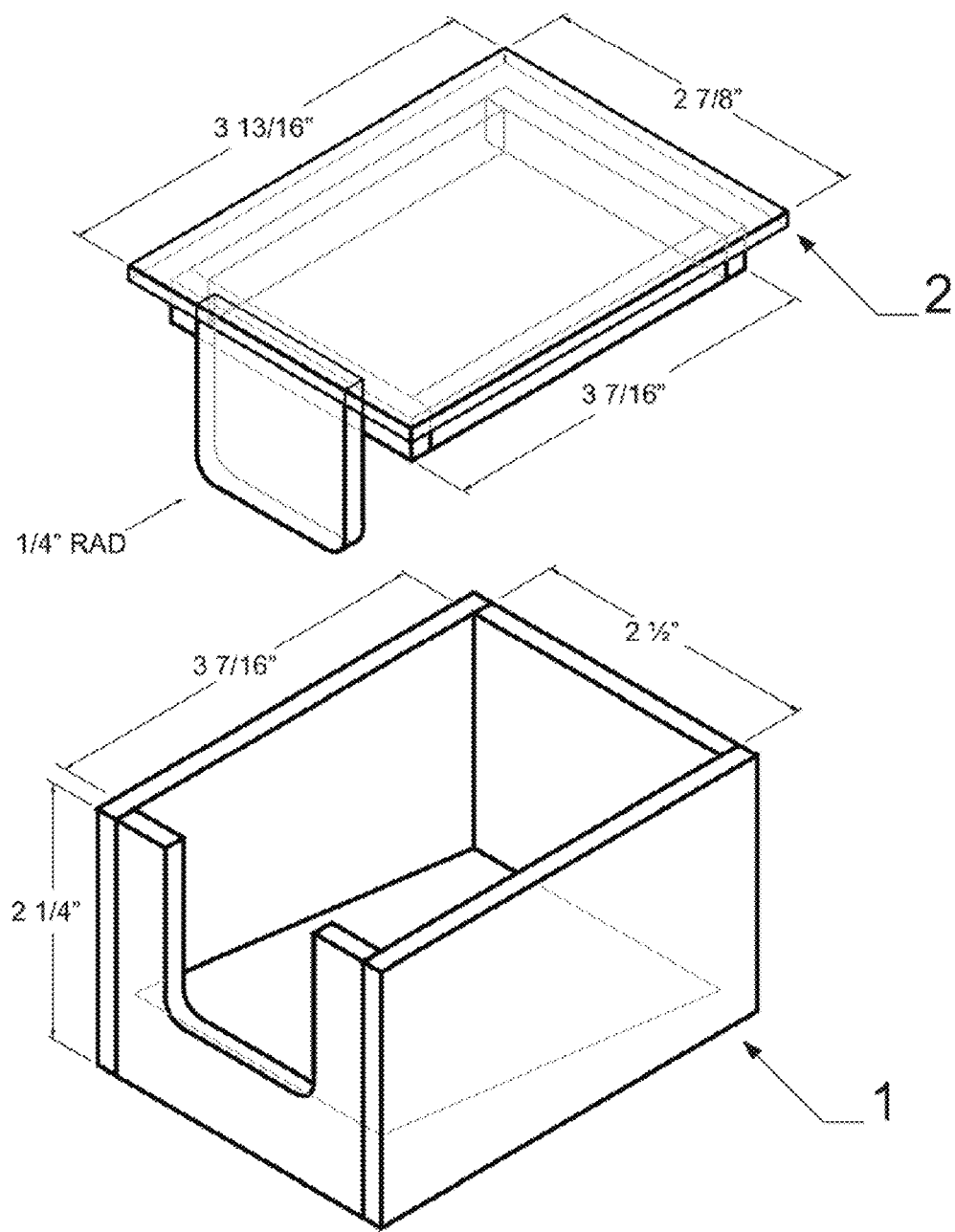
FIG. 8 Bottle Neck Salter Isometric View with measurements—Lid & Body, Ref 1 & 2
Figure 9:
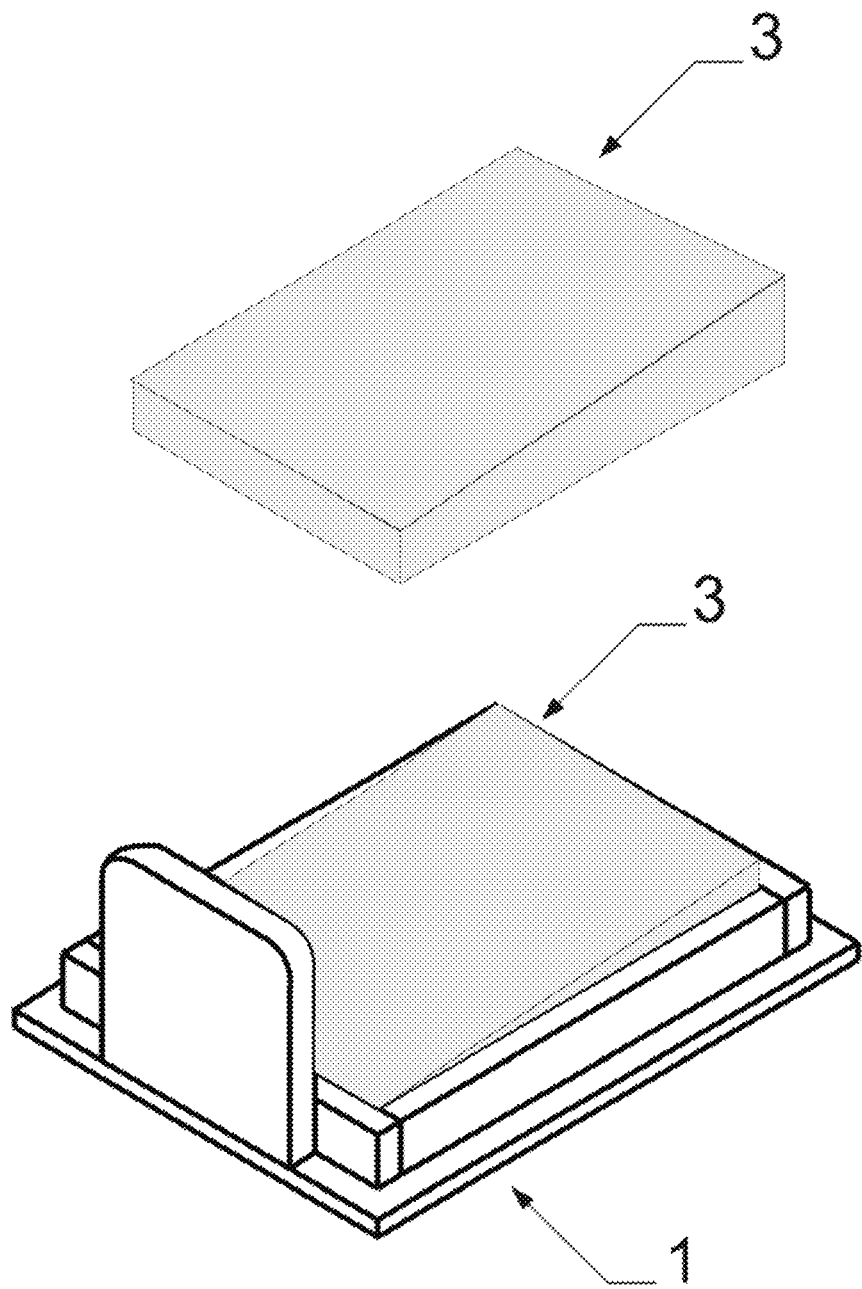
FIG. 9 Bottle Neck Salter Isometric View with sponge—Lid & Sponge, Ref 1 & 3
Figure 10:
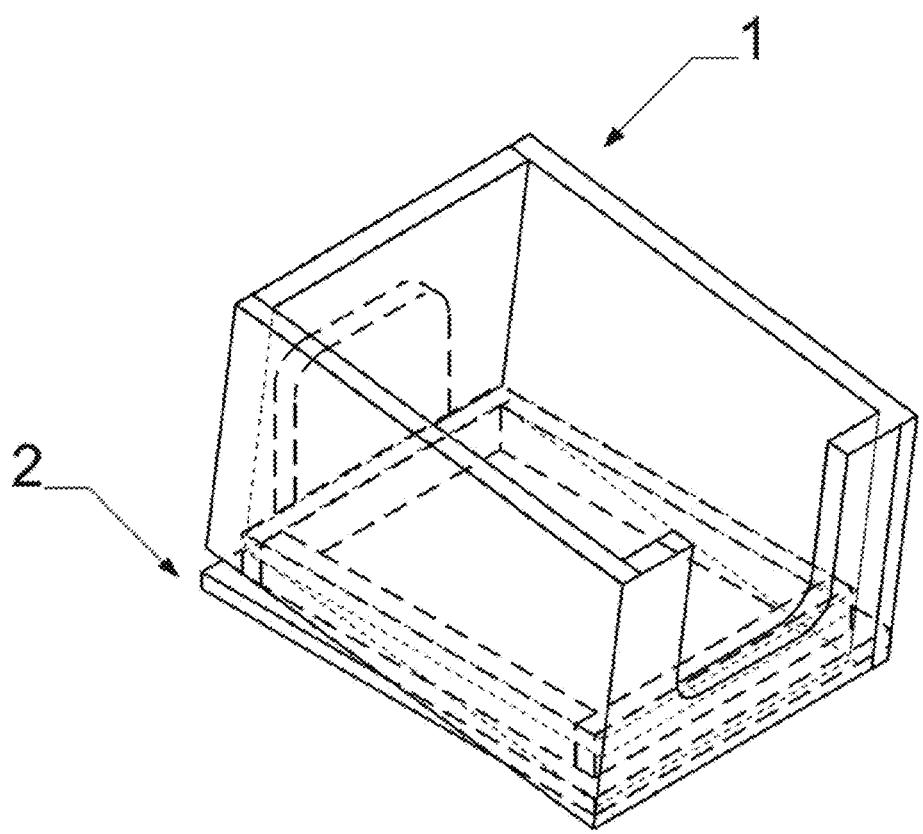
FIG. 10 Bottle Neck Salter Isometric View—Lid Storage—Lid & Body, Ref 1 & 2
Figure 11:
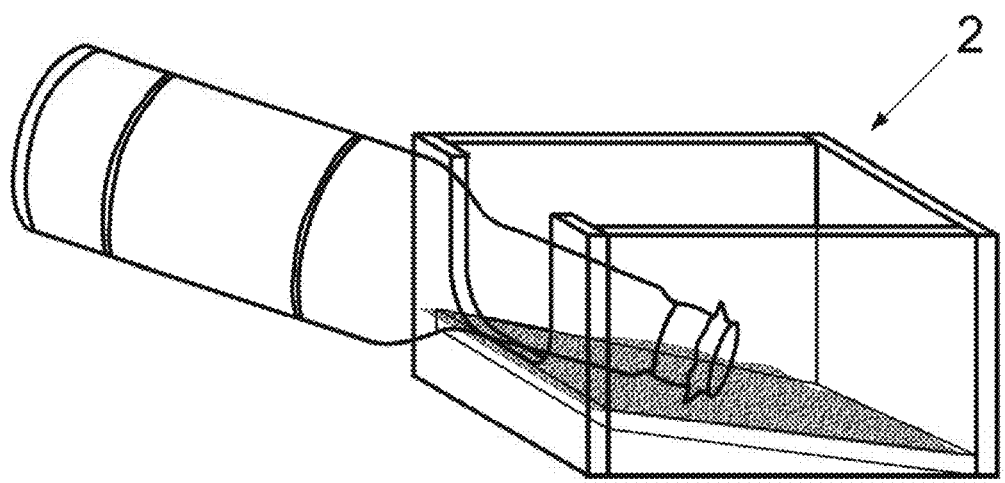
FIG. 11 Bottle Neck Salter Orthographic View with bottle & salt—Body, Ref 2

How the Invention Works:

The body of the device, (FIG. 8) holds the garnish substance i.e. salt, sugar, etc. used to coat the bottle neck. The container body is elongated with four adjacent sidewalls, two of the sidewalls being parallel with two traversing sidewalls being of lesser length than longer parallel sidewalls. One of the traversing sidewalls has the U-shaped cutout for receiving the tongue of the sealable lid. A base wall is connected to the sidewalls. The container body has an open top and a closed bottom. The closed bottom is slanted such that the bottom can matingly engage the inverted lid. The container body is configured to receive and/or store the edible substance and the U-shaped cutout configured to receive the bottle neck. The lid functions as a multifunction cover (FIG. 8). This multifunction cover functions as a lid to seal the main container body (FIG. 6/ref 1 & 2) for storage & hygiene and can also be used as a tray for the sponge (FIG. 9/ref 1 & 3). FIG. 9/ref 3 is the sponge which fits into the reversed cover (FIG. 9/ref 1) used as a tray for the sponge. The sponge is used to dampen the bottle neck before rolling the bottle neck in the garnish held in the main body (FIG. 11 with ref 2). The lid can also be used as a tray which fits perfectly underneath the main storage container for cleanliness & height during use of the main body of the device without the sponge (FIG. 10). The multipurpose lid is made to seal the body of the device with its contents for storage as it has an inside inset lip or ridge (FIG. 4/ref 2 & FIG. 6/ref 1 & 2) The U-shaped cutout on the body for bottle neck access is sealed by this lid evenly with an exact sized tongue as part of the lid for storage which fits flush and seals completely (FIG. 7/ref 1). The slanted bottom allows the top of the bottle to be tilted down to coat evenly with the salt, (FIG. 7/ref 2).

Figure 2:
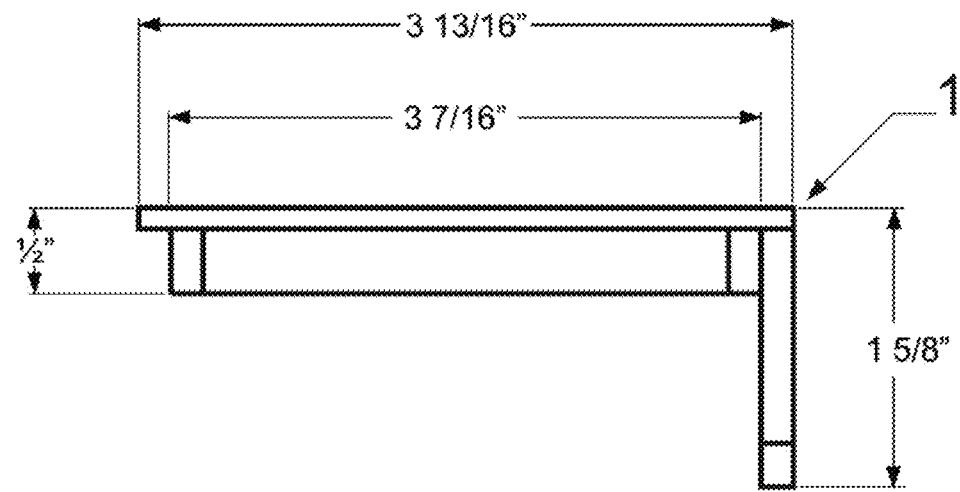
FIG. 2 Bottle Neck Salter Elevation View—Left: Lid & Body, Ref 1 & 2
Figure 2:
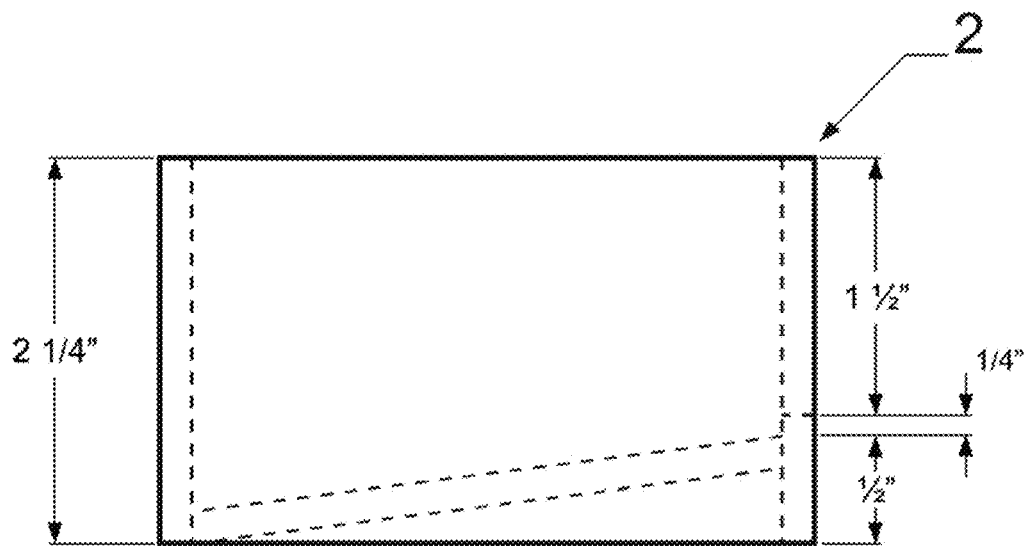
Figure 3:
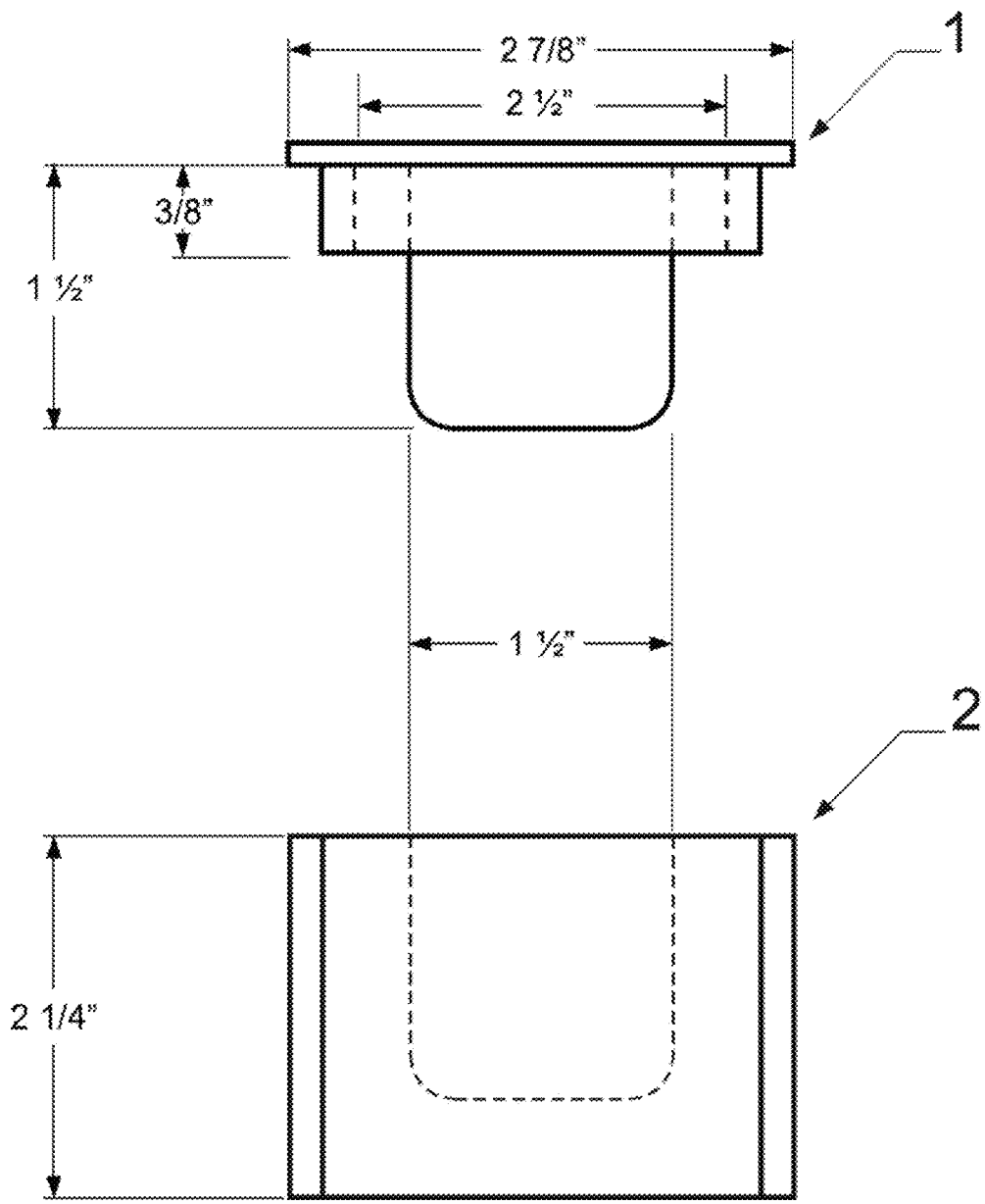
FIG. 3 Bottle Neck Salter Elevation View—Rear: Lid & Body, Ref 1 & 2

How to Make the Invention:

Originally, the first device was a plastic disposable storage container bought at the store cut out to accommodate a bottle neck. The lid did not seal the opening in the end, the salt was level with the hole, and salt went everywhere! There was a tentative prototype (FIGS. 1, 2, & 3/ref 1 & 2), as per the drawings, made from plexiglass but a lot of improvements were needed. The next step was to have a prototype made by a mold company from plastic. This would allow for rounded corners & a more lightweight device. The mold prototype is very expensive.

All elements shown are necessary. A notched swivel cover which is removable would be a good functional addition. The prototype demonstrated a need for the lower rim of the opening in FIG. 2/ref 2 that the bottle rests on to be separate and above the slanted bottom upper edge that meets it by a ¼ inch space to prevent the salt from spilling out.

The multifunction cover (FIG. 9/ref 1) can be a tray for the sponge (FIG. 9/ref 3), a hygienic lid for the storage container (FIG. 8), and an under tray for the storage container (FIG. 10), as well.

How to Use the Invention:

You would first set up the device for use by removing the lid (FIG. 6/ref 1 & 2), filling the body with the desired garnish, dampening the sponge placed in the reversed or inverted lid used as a sponge tray (FIG. 9/ref 1 & 3), and place the sponge tray beside the body of the container. Each unopened bottle neck would be rolled on the damp sponge then rolled at an angle in the salt to coat the bottle neck evenly with the garnish (FIG. 11/ref 2). This is called dressing the beverage. Then you would open the beverage, add a twist of fruit, if needed, wrap a napkin around it, and serve. If the sponge application is not needed, the lid can be reversed or inverted and placed underneath the main body with the tongue end to the back facing up to help prevent the main body from sliding off, to add height, and to prevent the lid from being misplaced. (FIG. 10)

Additionally: This simple device could be used in a variety of applications such as any field where an even coat of material application is needed i.e. food service, decoration of any object, & other applications. The application possibilities are many but here are a quick few:

Rolling any type of beverage bottle neck such as coffee, beer, soda, fruit juice, etc. in items like sugar, salt, powdered creamer, flavored pop rocks, flavored powders, crushed candy, chocolate, dried fruit and more.

Rolling any food item such as bananas, fruit, corn dogs, hot dogs, sausage, steak, any food on a stick, in items such as salt, pepper, spices, mustard, any condiment, nuts, cereal, coconut, fruit zest, onion flakes, sauces or any combination of these.

For inedible applications you could take any cylindrical object like plastic tubes, wooden dowels, pipe, pvc, metal tubes, and roll them using this device in beads, glitter, insulation, glitter, BBs, crushed glass, shredded paper, confetti, the uses are many.

This list is just the beginning. Basically, any item, cylindrical or otherwise, that will fit in the opening that you want to coat evenly in any type material, this device can be used for that.

For the purposes of this illustration and its initial use, the beer bottle neck rolled in salt is the best use of this device for its current application in the hospitality industry.

(FIG. 11/ref 2)

The invention claimed is:

1. A device for coating a bottle neck with an edible substance comprising:
    an elongated container body having four adjacent sidewalls, two of the sidewalls being parallel with two traversing sidewalls being of lesser length than longer parallel sidewalls, one of the traversing sidewalls having a U-shaped cutout for receiving a tongue of a sealable lid, a base wall connected to the sidewalls, the container body having an open top and a closed bottom, the closed bottom being slanted such that the bottom can matingly engage an inverted lid, the container body configured to receive and/or store the edible substance and the U-shaped cutout configured to receive the bottle neck;
    a sponge for dampening the bottle neck, the sponge having a sloping upper surface and a planar bottom surface; and
    a lid having a planar surface, an inset ridge extending about the perimeter of the planar surface, the inset ridge including four adjacent lid sidewalls, two of the lid sidewalls being parallel with two traversing lid sidewalls being of a lesser length than the longer parallel lid sidewalls, one of the traversing lid sidewalls having a tongue attached thereto, the tongue extending therefrom a predetermined length beyond a height of the lid sidewalls, the tongue sized and shaped to matingly engage the U-shaped cutout of the container body to form a flush fit and thereby completely seal the lid on the container body when the device is to be closed;
    wherein when the device is opened, the lid can be removed from the container body and inverted, the sloping sponge can be placed within the inverted lid to dampen the bottle neck and the dampened bottle neck can be placed in the U-shaped cutout and rolled in edible substance within the container body for uniformly coating the bottle neck with the edible substance.

2. The device for coating a bottle neck according to claim 1, wherein when the lid is inverted, a slanted opening formed on an exterior of the bottom of the container body is sized to fit on the lid to enable the inverted lid to store the container body thereon for saving storage space.

* * * * *